United States Patent [19]
Twardowska

[11] 4,421,728
[45] Dec. 20, 1983

[54] STABILIZATION OF RED PHOSPHORUS

[75] Inventor: Helena Twardowska, Mississauga, Canada

[73] Assignee: ERCO Industries Limited, Islington, Canada

[21] Appl. No.: 396,125

[22] Filed: Jul. 7, 1982

[51] Int. Cl.$^3$ ...................... C01B 25/01; C01B 25/02; C01B 25/04

[52] U.S. Cl. .................................... 423/265; 423/267; 423/275; 423/322; 252/381; 252/385; 252/397

[58] Field of Search ............... 423/322, 323, 265, 266, 423/274, 275, 267; 252/381, 385, 397

[56] References Cited

U.S. PATENT DOCUMENTS

| | | | |
|---|---|---|---|
| 1,880,538 | 10/1932 | Waggaman et al. | 252/385 X |
| 3,974,260 | 8/1976 | Wortmann et al. | 423/265 |
| 4,115,522 | 9/1978 | Staendeke et al. | 423/265 |
| 4,136,154 | 1/1979 | Staendeke et al. | 423/265 |
| 4,210,630 | 7/1980 | Dany et al. | 423/265 |

*Primary Examiner*—Gregory A. Heller
*Attorney, Agent, or Firm*—Sim & McBurney

[57] ABSTRACT

Particulate red amorphous phosphorus is stabilized against oxidative degradation to phosphorus acids and phosphine by the use of titanium dioxide or titanium phosphate.

17 Claims, 4 Drawing Figures

Commercial RAP untreated
2000 ppm Aℓ
2000 ppm Ti
3000 ppm Ti
5000 ppm Ti
mg $H_3PO_4$/g RAP
TIME IN OVEN (HOURS)

3000 ppm Aℓ as AℓPO$_4$ at pH = 7.0
3000 ppm Aℓ as AℓPO$_4$ at pH = 3.2
3000 ppm Aℓ as Al(OH)$_3$ +8500 ppm Pb as Pb(OH)$_2$
3000 ppm Ti as Ti phosphate
3000 ppm Ti as TiO$_2$
mg $H_3PO_4$/g RAP
TIME IN OVEN (HOURS)

untreated RAP
3000 ppm Aℓ
as AℓPO4 pH=3
at pH=9.0
at pH=7.0
at pH=6.0
at pH=3.0
mg H3 PO4 / g RAP
0
20
40
60
80
100
120
140
160
180
200
TIME IN OVEN (HOURS)

3000 Ti + 2000 ppm Cu
RAP untreated
3000 Ti +
2000 ppm Aℓ
3000 Ti + 4000
ppm Pb
3000 Ti + 8000
ppm Pb
mg H3 PO4 / g RAP
0
20
40
60
80
100
120
140
160
180
200
TIME IN OVEN ( HOURS)

STABILIZATION OF RED PHOSPHORUS

FIELD OF INVENTION

The present invention relates to red phosphorus which is stabilized against oxidation.

BACKGROUND TO THE INVENTION

It is known that red phosphorus upon storage in a moist atmosphere, undergoes a chemical reaction with the resultant-formation of various acids of phosphorus, mainly phosphorous acid and phosphoric acid, and phosphine. The formation of the highly toxic phosphine gives rise to hazardous working conditions and the formation of the phosphorus and phosphoric acids is undesirable in end uses of red phosphorus. Aluminum in the form of its hydroxide has been widely used to stabilize red phosphorus against such oxidation. However, relatively large amounts of aluminum are required to achieve a significant degree of stabilization.

An additional problem which arises with the prior art aluminum treatment is that the product is difficult to process. A layer of alumina is precipitated onto the red phosphorus particles in an aqueous dispersion thereof and then the treated red phosphorus is filtered and dried. Efficient filtration of the treated red phosphorus is difficult to achieve as a result of gelation of the aluminum hydroxide and large quantities of water are retained by the aluminum hydroxide.

Recently, it has been suggested in U.S. Pat. No. 4,115,522 to effect stabilization using orthophosphoric acid salts of aluminum, magnesium, calcium or zinc. The aluminum salt is the most effective and, again, relatively large quantities are required.

More recently, U.S. Pat. No. 4,210,630 suggests that improved stabilization can be achieved by using lead hydroxide in combination with aluminum hydroxide. A further suggestion, set forth in Canadian Pat. No. 1,097,152, is to superficially cover each red phosphorus particle with a thin film of a hardened melamine-formaldehyde resin.

SUMMARY OF INVENTION

It has now surprisingly been found that titanium dioxide and titanium phosphate are particularly effective stabilizers of red phosphorus and may be used in lesser quantities than is required for aluminum hydroxide treatment. In addition, when the titanium dioxide and titanium phosphate treatment is effected by precipitation from aqueous medium, the treated red phosphorus is readily and rapidly filtered, in contrast to treatment with aluminum hydroxide.

In contrast to aluminum hydroxide-treated red phosphorus, the titania-treated red phosphorus of this invention may be heated at elevated temperatures up to 300° C. without the evolution of water, rendering the product suited to addition to plastics which are processed at high temperatures.

GENERAL DESCRIPTION OF INVENTION

Figures 1, 2:
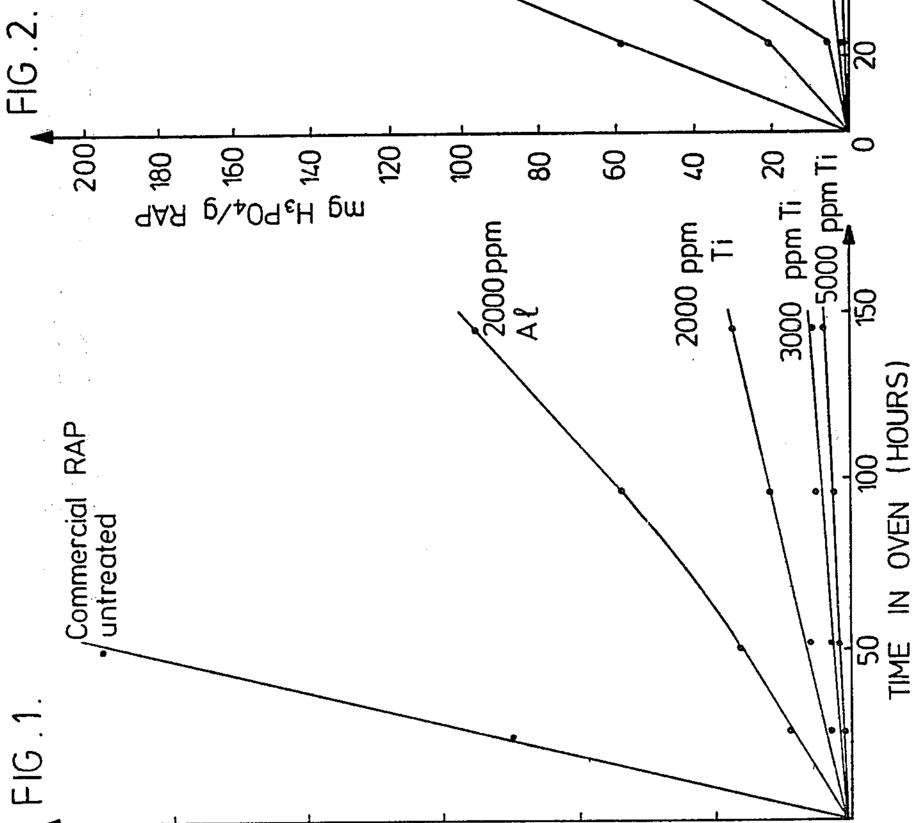
FIG. 1 is a graphical representation of the effect of titanium dioxide and aluminum hydroxide on the oxidation stability of red phosphorus.
FIG. 2 is a graphical representation of the effect of titanium and aluminum compounds on the oxidation stability of red phosphorus.

The red phosphorus, which is treated by titanium dioxide or phosphate in accordance with this invention, is in particulate form with a size of at most 2 mm and preferably about 0.01 to 0.15 mm. The red phosphorus particles are formed into a homogeneous blend with titanium dioxide or titanium phosphate. The amount of titanium compound may vary from about 0.05 to about 2.0 wt %, expressed at Ti.

The treatment of the red phosphorus by titanium dioxide may be effected in the aqueous phase to cause precipitation of hydrated titanium dioxide on the red phosphorus followed by drying and dehydration. In this procedure, the red phosphorus particles may be suspended in water and the resulting slurry heated to about 60° to 95° C., preferably about 80° to 90° C. The heated slurry is gradually mixed with the required amount of a titanium salt, for example, titanium sulphate or titanium tetrachloride, to achieve the desired treatment level at a slightly acid pH. The pH of the slurry then is adjusted to a value in the range of about 2 to about 6 to effect precipitation of hydrated titanium dioxide on the red phosphorus particles. The mixture is filtered and the treated red phosphorus dried and dehydrated at a temperature of about 100° to about 130° C. in a vacuum oven.

The treatment of the red phosphorus particles by titanium phosphate may be effected in the aqueous phase in analogous manner to the aqueous phase treatment by titanium dioxide described above except that orthophosphoric acid or a water-soluble salt of orthophosphoric acid, for example, sodium dihydrogen phosphate, and titanium sulphate are added to the slurry, rather than titanium sulphate or titanium tetrachloride alone.

An alternative procedure for treatment of the red phosphorus by titanium dioxide is by vapor phase formation of the titanium dioxide. Such a procedure is beneficial when the source of the titanium is a readily-hydrolyzable organic titanate, for example, those sold by Du Pont under the trademarks Tyzor TPT and Tyzor TBT. In this process, the liquid titanate may be metered through an atomizing nozzle into a stream of hot dry air at a temperature of about 150° to about 180° C., which then is brought into contact with the red phosphorus particles. Alternatively, a preheated stream of nitrogen or other convenient gas may be passed through the titanate liquid and the resultant stream brought into contact with the red phosphorus. Contact between the vapors of organic titanate conveyed by the gas stream and the red phosphorus particles caused adsorption of the organic titanate on the red phosphorus particles.

Similarly, some inorganic titanium compounds that hydrolyze easily, for example, titanium tetrachloride, may be used for vapor treatment. Red phosphorus may be mixed with titanium tetrachloride in a closed vessel at ambient temperature to cause adsorption of the titanium tetrachloride on the red phosphorus particles.

The red phosphorus particles bearing the titanium compound are next exposed to moisture to hydrolyze the titanate to form a coating of titanium dioxide on the surface of the red phosphorus particles. Hydrolysis by-products are removed by heating under vacuum to avoid odor development on storage.

The treatment of the red phosphorus particles with titanium tetrachloride, or other readily-hydrolyzable titanium compound, for example, hydrolyzable organic titanates, may be used to remove residual moisture from the red phosphorus. In this procedure, the titanium tetrachloride is mixed with red phosphorus particles in a closed vessel at ambient temperature for about 1 to 2 hours. Reaction occurs between moisture in the red phosphorus particles and the titanium tetrachloride forming titanium dioxide.

The quantity of titanium tetrachloride used depends on the moisture content of the red phosphorus particles. Any residual titanium tetrachloride may be purged, along with by-product HCl, with dry air or dry nitrogen. Removal of moisture from the red phosphorus in this way not only stabilizes the red phosphorus but enables drying of the red phosphorus to be effected without extensive high temperature heating operations.

Red phosphorus which is treated with titanium dioxide or titanium phosphate in accordance with the present invention is significantly more stable than that treated with aluminum phosphate, aluminum hydroxide or a combination of aluminum and lead hydroxides at the same level of application of Ti and Al. Titanium dioxide is slightly better than titanium phosphate in stabilizing the red amorphous phosphorus.

Although it is known to enhance the stability achieved with aluminum hydroxide by using a combination with lead hydroxide (see U.S. Pat. No. 4,210,630 referred to above), it has been found that the combination of titanium dioxide with aluminum or lead oxides does not exhibit any greater stability than titanium dioxide alone. It is preferred, therefore, in this invention to use titanium dioxide alone or titanium phosphate alone.

Red phosphorus which has been treated in accordance with this invention requires much less time to filter and exhibits a much lower water retention than aluminum hydroxide-treated red phosphorus, resulting in a significant decrease in the processing time required in this invention, as compared with the prior art.

The improved stability which is achieved in accordance with this invention results in a significant decrease in acid formation and the generation of phosphine upon storage of the treated red phosphorus.

EXAMPLES

EXAMPLE 1

Red amorphous phosphorus of particle size typically 0.15 to 0.01 mm was suspended in water to a concentration of about 25% by weight of red amorphous phosphorus and the resulting slurry heated to about 80° to 90° C. Varying quantities of titanium sulphate, corresponding to 2000, 3000 and 5000 ppm of Ti, were added to samples of the slurry and the pH of the slurry adjusted to a value of 3 to cause the precipitation of hydrated titanium dioxide thereon. The suspension was stirred for a further 1 hour, the mixture filtered and the filter residue dried at about 100° C. for about 16 hours in a vacuum oven.

The samples of treated red phosphorus were tested for stability to oxidation and the results compared with those for untreated red phosphorus and red phosphorus treated with aluminum hydroxide. The aluminum hydroxide treatment was effected using alum at pH 9 to precipitate aluminum hydroxide on the red phosphorus in an amount corresponding to 2000 ppm of Al.

The stability to oxidation of the red phosphorus was tested by storing samples at 70° C. under 100% relative humidity and measuring the acidity, expressed as $H_3PO_4$, by pH titration. The results obtained are set forth in the graph of FIG. 1.

As may be seen from FIG. 1, red amorphous phosphorus treated with titanium dioxide is extremely stable at amounts of Ti of 3000 ppm and higher. Treatment with titanium dioxide at the same concentration level (2000 ppm) produces a greater stability when compared with aluminated red phosphorus.

It was also observed that the amount of $PH_3$ evolved from the red phosphorus was also significantly decreased by treatment with titanium dioxide.

EXAMPLE 2

Red phosphorus of typical particle size from 0.15 to 0.01 mm, after boiling with caustic soda to remove unreacted yellow phosphorus, was treated with Ti and Al compounds using the procedures described in Example 1. Titanium phosphate treatment was achieved by adding sodium dihydrogen phosphate to the slurry along with the titanium sulphate and adjusting the pH to about 3.

The treated samples were tested for acidity development under the conditions recited in Example 1 and the results are reproduced in the graph of FIG. 2. As may be seen from FIG. 2, red amorphous phosphorus treated with titanium dioxide or titanium phosphate is significantly more stable than that treated with aluminum phosphate or a combination of aluminum and lead hydroxides, under the same levels of Ti and Al treatment (3000 ppm). In the case of aluminum phosphate treatment, the red amorphous phosphorus was significantly less stable when treated at pH 7 as compared to treatment at pH 3.2.

The treated samples were also treated for phosphine evolution and compared with untreated samples. One gram portions were stored in vials (69 cu. cm) with a septum to provide for instant access by syringe. After repeated stirring and leaving to stand at room temperature, the phosphine concentration (expressed as ppm by weight of RAP) was determined by gas chromatography with a flame photometric detector. The results obtained are reproduced in the following Table I:

TABLE I

| Sample No. | Sample Treatment | Exposure (days) | $PH_3$ concn. (ppm) |
|---|---|---|---|
| 1 | RAP* + 3000 ppm Al as $AlPO_4$ at pH 7 | 6 | 2.12 |
| 2 | as 1, except treated at pH 3.2 | 6 | 0.27 |
| 3 | RAP + 3000 ppm Ti as $TiO_2$ | 6 | 0.33 |
| 4 | RAP + 3000 ppm Ti as Ti phosphate | 6 | 0.38 |
| 5 | RAP + 3000 ppm Al as $Al(OH)_3$ + 8500 ppm Pb as $Pb(OH)_2$ | 6 | 0.12 |
| 6 | Untreated RAP | 6 | 2.23 |
| 7 | Commercial RAP | 10 | 8.06 |

*RAP is red amorphous phosphorus

As may be seen from the results set forth in Table I, phosphine evolution was greatly decreased by treatment of the red amorphous phosphorus both by Al and Ti compounds.

EXAMPLE 3

Samples of red amorphous phosphorus of typical particle size of 0.15 to 0.01 mm were treated with a combination of titanium dioxide and other metallic compounds using the procedure of Example 1 with appropriate salts being used to effect precipitation of the other metals in hydroxide form.

Figure 3:
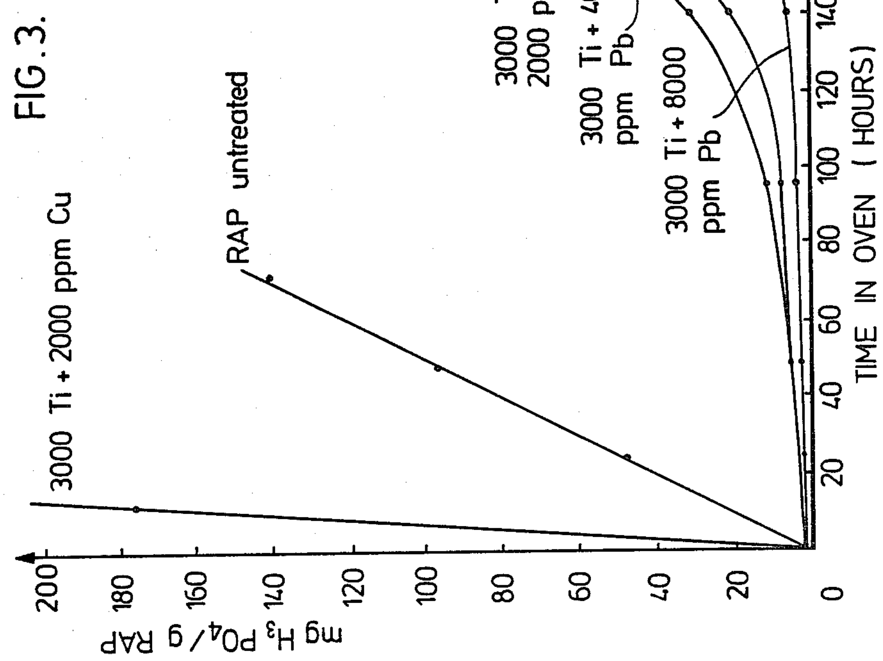
FIG. 3 is a graphical representation of the effect of titanium dioxide in combination with hydroxides of other metals on the oxidation stability of red phosphorus.

The treated samples were tested for acidity development under the conditions recited in Example 1 in comparison with untreated samples and the results are reproduced in the graph of FIG. 3. As may be seen from the results of FIG. 3 in comparison with those of FIGS. 1 and 2, treatment of the red amorphous phosphorus with a combination of $TiO_2$ and lead or aluminum hydroxides does not show better stability than treatment with $TiO_2$ alone. In the case of copper hydroxide, a very high acid development was observed, even higher than the red phosphorus itself.

The treated samples were also tested for phosphine production, following the procedure recited in Example 2, in comparison with untreated samples, and the results are reproduced in the following Table II:

TABLE II

| Sample no. | Sample Treatment | Exposure (days) | $PH_3$ Concn. (ppm) |
|---|---|---|---|
| 1 | 3000 ppm Ti as $TiO_2$ + 4000 ppm Pb as $Pb(OH)_2$ at pH 9 | 6 | 1.84 |
| 2 | 3000 ppm Ti as $TiO_2$ + 8000 ppm Pb as Pb(OH) at pH 9 | 6 | 0.32 |
| 3 | 3000 ppm Ti as $TiO_2$ + 2000 ppm Cu as $Cu(OH)_2$ at pH 9 | 6 | 0.015 |
| 4 | 3000 ppm Ti as $TiO_2$ + 2000 ppm Al as $Al(OH)_3$ at pH 9 | 6 | 2.21 |
| 5 | 3000 ppm Ti as $TiO_2$ | 6 | 0.33 |
| 6 | Untreated RAP | 6 | 2.23 |

The results of the above Table II show that there is no improvement in achieving a decrease in phosphine production when lead is present, and in fact phosphine formation is higher than for $TiO_2$ alone. Treatment with a combination of $TiO_2$ and $Cu(OH)_2$ produced a significant decrease in phosphine production, but, as noted above, leads to a substantial increase in acid formation.

EXAMPLE 4

The filtration properties of untreated red amorphous phosphorus, red phosphorus treated with $Al(OH)_3$ and red phosphorus treated with $TiO_2$ were compared. In each case, a slurry of particles was stirred for one hour at 80° to 85° C., cooled to 60° C. and filtered on a laboratory vacuum filter. The time needed for filtration and the water content of the filter cake were determined. The results are reproduced in the following Table III:

TABLE III

| Sample no | Sample Treatment | Filtration Time (secs) | Water Retention wt % of cake |
|---|---|---|---|
| 1 | 3000 ppm Al as $Al(OH)_3$ at pH 9 | 280 | 24.7 |
| 2 | 3000 ppm Ti as $TiO_2$ at pH 3 | 149 | 18.6 |
| 3 | 3000 ppm Ti as $TiO_2$ at pH 4 | 143 | 19.3 |
| 4 | Untreated RAP | 126 | 13.7 |

As may be seen from the results of Table III, the untreated red amorphous phosphorus had the best filtration properties but RAP treated with $TiO_2$ at pH 3 or 4 required considerably less time for filtration and retains a lesser amount of water than $Al(OH)_3$ treated RAP.

EXAMPLE 5

Samples of red amorphous phosphorus of typical particle size of 0.15 to 0.01 mm of moisture content of about 0.20% were carefully mixed with titanium tetrachloride in a closed vial at room temperature for 2 hours. The titanium tetrachloride was hydrolyzed by moisture in the red phosphorus to form titanium dioxide thereon. Excess titanium tetrachloride and by-product HCl were removed by purging with a dry air stream. The treated samples were tested for acidity development under the conditions recited in Example 1 and, at an applied level of Ti of 2400 ppm and 3100 ppm, acidity development was found to be comparable to that for samples treated with 3000 ppm Ti by the solution procedure of Example 1.

The moisture content of the treated red phosphorus particles was also determined and the results are set forth in the following Table IV:

TABLE IV

| Sample No. | Sample Treatment | Moisture Content (wt %) |
|---|---|---|
| 1 | 3100 ppm Ti | 0.08 |
| 2 | 2550 ppm Ti | 0.05 |
| 3 | 2400 ppm Ti | 0.05 |

The low residual moisture content of these examples is comparable to the moisture level of RAP samples dried in a vacuum oven at 100° C. for three days.

EXAMPLE 6

The effect of the pH of $TiO_2$ precipitation following the procedure of Example 1 on the stability of treated red amorphous phosphorus was tested. The oxidation stability results obtained in accordance with the test procedure described in Example 1, are reproduced graphically as FIG. 4.

Figure 4:
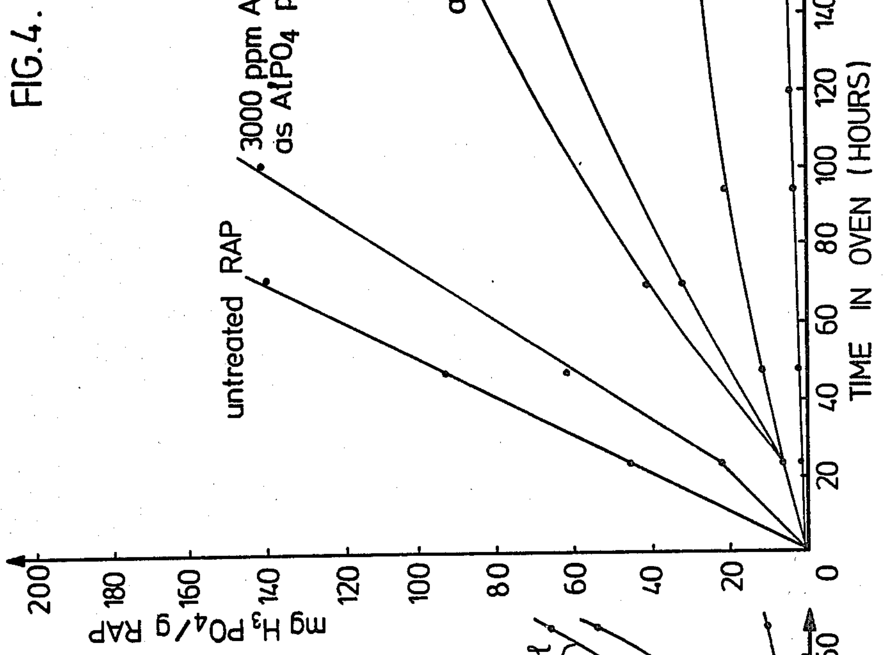
FIG. 4 is a graphical representation of the effect of pH of precipitation of titanium dioxide on the oxidation stability of red phosphorus.

As seen in FIG. 4, red phosphorus treated at pH 3 is very stable against oxidation but the stability decreases with increasing pH values for $TiO_2$ precipitation.

SUMMARY OF DISCLOSURE

In summary of this disclosure, the present invention provides a novel red amorphous phosphorus having improved stability against oxidation by way of treatment with titanium in the form of titanium dioxide or titanium phosphate. Modifications are possible within the scope of this invention.

What I claim is:

1. A homogeneous blend of red phosphorus having a particle size of at most about 2 mm and an oxidation stabilizing amount of titanium in the form of titanium dioxide or titanium phosphate.

2. The blend of claim 1 wherein said titanium is present in an amount of about 0.05 to about 2.0 wt%.

3. The blend of claim 1 or 2 wherein said red phosphorus particle size is about 0.01 to 0.15 mm.

4. A process for producing red phosphorus stabilized against oxidation, which comprises:

forming a slurry of red phosphorus particles of particle size of at most about 2 mm, heating said slurry to a temperature of about 60° to about 95° C., adding to the heated slurry a titanium compound in an amount to provide an oxidation stabilizing amount of titanium on the red phosphorus particles, said titanium compound being one whereby titanium dioxide or titanium phosphate precipitates in said slurry, adjusting the pH of said slurry to a value of about 2 to 6 to effect precipitation of titanium dioxide or titanium phosphate on the red phosphorus particles, separating the red phosphorus particles so treated from the slurry, and drying the separated treated particles to form a homogenous blend of red phosphorus particles and titanium dioxide or titanium phosphate.

5. The process of claim 4 wherein said slurry is heated to a temperature of about 80° to 90° C.

6. The process of claim 4 wherein said treated red phosphorus particles are dried at about 100° to about 130° C.

7. The process of claim 4, 5 or 6 wherein said titanium compound is added to the slurry in an amount sufficient to deposit about 0.05 to about 2 wt% Ti on the phosphorus particles.

8. The process of claim 7 wherein said titanium compound is titanium sulphate or titanium tetrachloride, whereby titanium dioxide precipitates on said red phosphorus particles.

9. The process of claim 7 wherein said titanium compound is titanium sulphate and orthophosphoric acid or a water-soluble salt of orthophosphoric acid also is added to said slurry, whereby titanium phosphate precipitates on said red phosphorus particles.

10. A process for producing red phosphorus particles stabilized against oxidation by titanium dioxide, which comprises:

bringing into contact with red phosphorus particles of size at most about 2 mm the vapors of a volatile hydrolyzable compound of titanium to cause adsorption of such vapors to the surface of the particles, said titanium compound being adsorbed in an amount sufficient to provide oxidation stability to said red phosphorus particles following hydrolysis of said compound, and hydrolyzing the adsorbed titanium compound to provide a homogeneous blend of red phosphorus and titanium dioxide.

11. The process of claim 10 wherein said titanium compound is a volatile organic titanate or titanium tetrachloride.

12. The process of claim 10 or 11 wherein said contact is effected by forming a stream of the titanium compound in a carrier gas and flowing said stream into contact with a bed of red phosphorus particles.

13. A process for producing red phosphorus particles stabilized against oxidation by titanium dioxide, which comprises:

mixing red phosphorus particles with a hydrolyzable titanium compound, and effecting hydrolysis of said titanium compound in contact with said red phosphorus particles to form titanium dioxide on the surface of said red phosphorus particles.

14. The process of claim 13 wherein said hydrolysis is effected by moisture present in said red phosphorus particles.

15. The process of claim 13 wherein said mixing is effected in a closed vessel and said hydrolysis is effected by introducing moisture to said vessel.

16. The process of claim 13 including removing any unreacted titanium compound and by-products from said titanium dioxide treated red phosphorus particles.

17. The process of claim 13, 14, 15 or 16 wherein said titanium compound is titanium tetrachloride.

* * * * *